June 6, 1944.  R. R. GONSETT ET AL  2,350,607
RHEOSTAT AND THE METHOD OF ITS MANUFACTURE
Filed Oct. 28, 1942   3 Sheets-Sheet 1
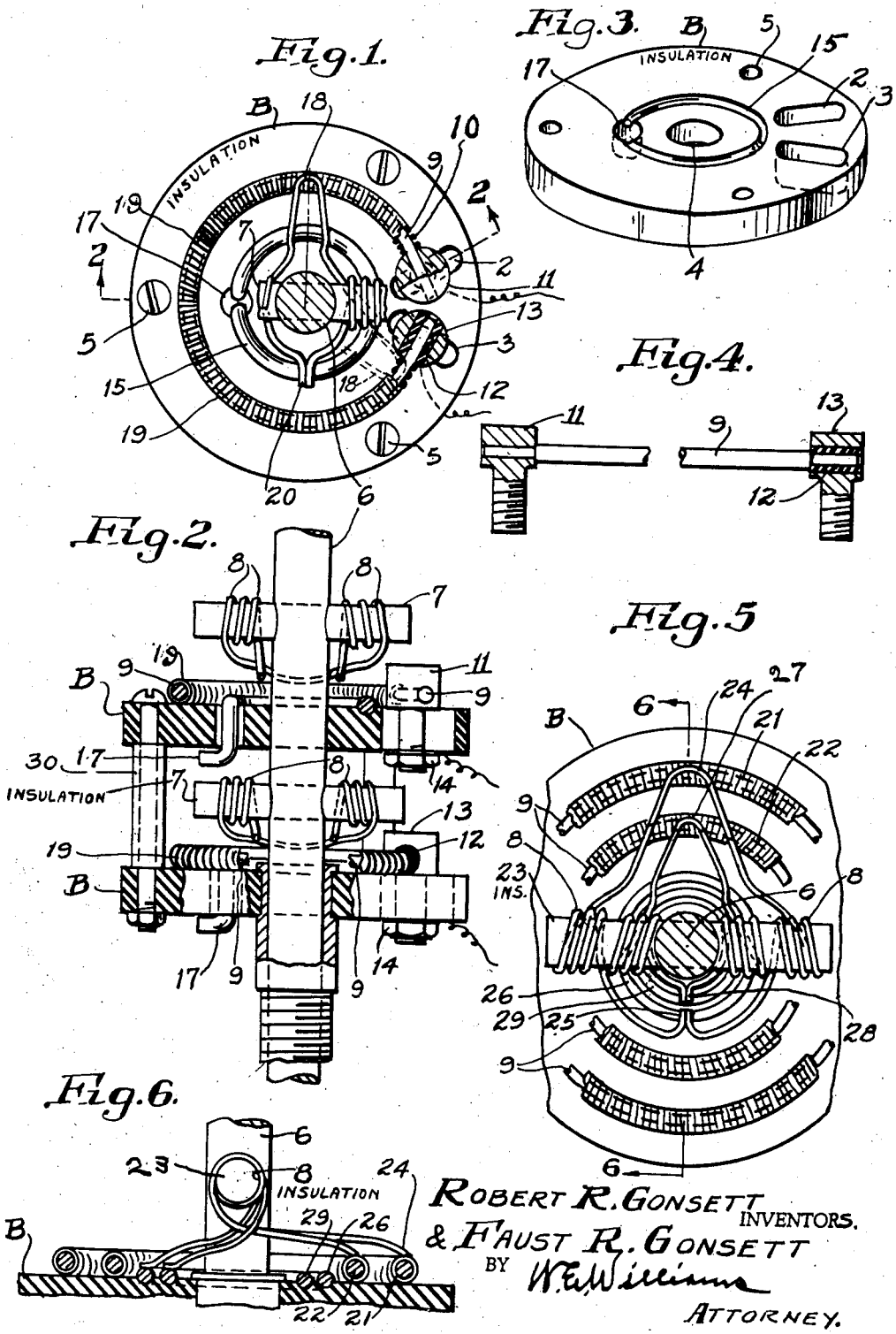
Robert R. Gonsett
& Faust R. Gonsett INVENTORS.
BY W. E. Williams
ATTORNEY.

INVENTORS.
ROBERT R. GONSETT
& FAUST R. GONSETT
BY W. E. Williams
ATTORNEY

ROBERT R. GONSETT
& FAUST R. GONSETT INVENTORS.

BY W. E. Williams

ATTORNEY.

Patented June 6, 1944

2,350,607

UNITED STATES PATENT OFFICE 2,350,607

RHEOSTAT AND THE METHOD OF ITS MANUFACTURE

Robert R. Gonsett and Faust R. Gonsett, Los Angeles, Calif.

Application October 28, 1942, Serial No. 463,710

14 Claims. (Cl. 201—56)

Our invention relates to form of construction and method of manufacture of precision rheostats.

Rheostats of this type find use in instruments wherein specific values of resistance serve as selective indicators of special factors. The following paragraphs embody the objects of our invention.

Our invention pertains to special details of construction and not to the broad factors of general manufacture of rheostats.

An object of this invention is means of mounting a resistor or resistors on a support or supports so that the control shaft, with its respective brush or brushes mounted thereon, will rotate a predetermined number of degrees with one or more resistors in use, said resistors may be of the same or dissimilar lengths in respect to each other, resistors may be of the same or different values.

One item of importance in our invention relates to base supports for a resistance coil or coils whereby these bases serve as the frame of the rheostat or rheostats, and one form of these bases is adaptable to be used with a range of variable values of rheostats.

Another feature of our invention relates to the detailed construction of the brush for registering an exact maximum and minimum amount of resistance in any given instance or unit rheostat.

Another construction feature of our invention is shown by the design of the terminal connections of the resistance coil whereby the brush registers at an exact determined zero or maximum value.

Another feature of our invention utilizes a stationary conductor ring upon which the rotary brush assembly slides, the conductor is imbedded into the support.

Reference will be had to the accompanying drawings in which:

Figure 1 is a plan view of one of our rheostats in which there is a single resistance element.

Figure 2 is a vertical sectional elevation on line 2—2 of Figure 1 and this figure has added thereto an additional rheostat from a single rheostat plan as shown in Figure 1.

Figure 3 is a perspective view of a base frame support formed of non-electric or insulating material, preferably of a suitable vulcanite product. On this support there is shown in Figure 3 an electric conductor ring.

Figure 4 indicates a straight rod core and its supports on which the resistance coil is wound.

Figure 5 is a plan of support or similar construction as that shown in Figure 3, but in Figure 5, there is shown mounted on the support two independent sets of rheostat resistance coils.

Figure 6 indicates a sectional view on line 6—6 of Figure 5.

Figure 7:
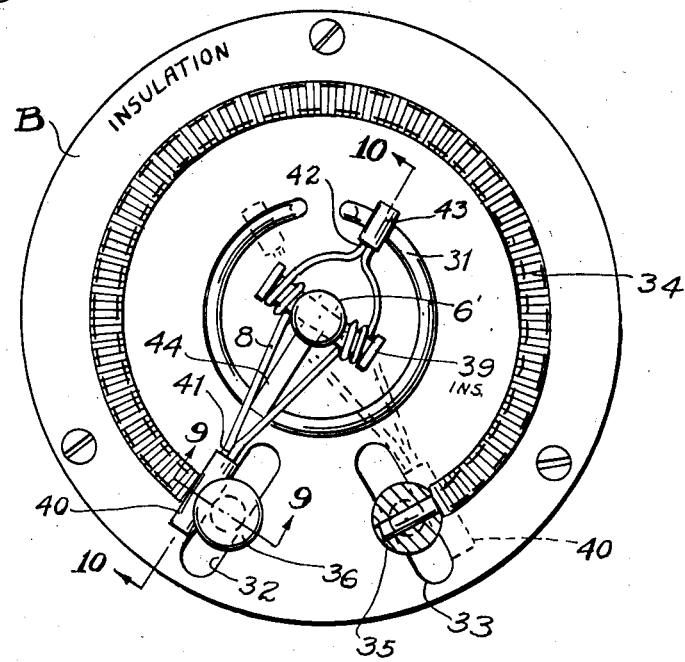

Figure 7 is a plan of a modified form as relates to the contact brush and to the form of construction of the resistance coil.

Figure 8:
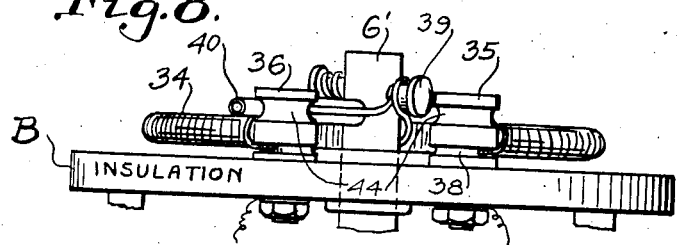

Figure 8 is a side elevation of what is shown in Figure 7 looking upwardly from the lower side of Figure 7.

Figure 9:
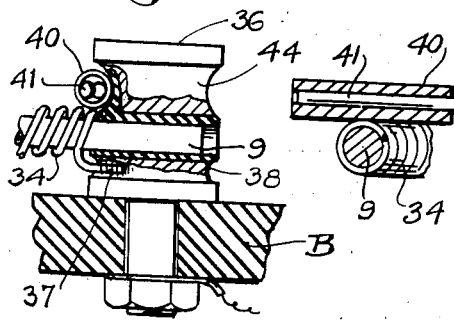

Figure 9 is a sectional detail on line 9—9 of Figure 7.

Figure 10:
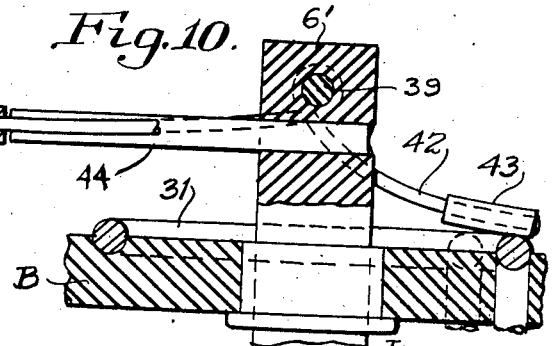

Figure 10 is a vertical sectional elevation on line 10—10 of Figure 7.

Figure 11:
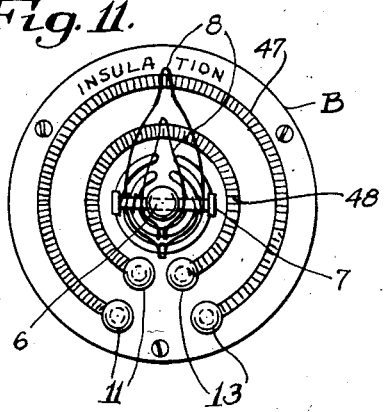

Modified forms of details of the instrument are shown in Figures 11, 12, 13 and 14 in which Figure 11 is a plan view similar to that of Figures 1, 5 and 7 with modified constructional details.

Figure 12:
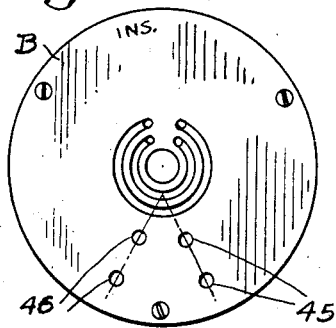

Figure 12 is a plan of the base disk support, such as is shown in Figure 11, having parts omitted which are shown in Figure 11 for clearness of illustration.

Figure 13:
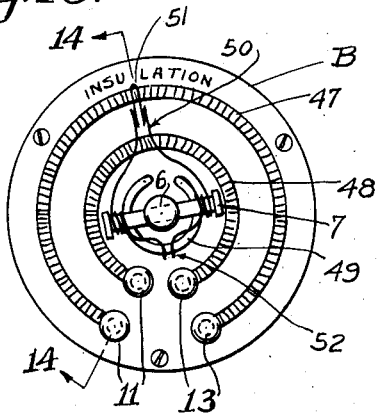

Figure 13 is a modified form of what is shown in Figure 11 illustrating the connections of a plural set of resistance coils electrically connected across to a single conductor ring.

Figure 14:
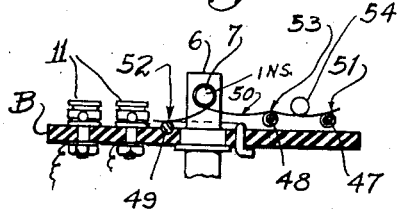

Figure 14 is a sectional elevational view of what is shown in Figure 13 on line 14—14 of Figure 13.

Figure 15:
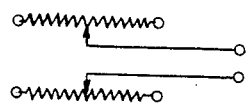

Figure 15 is a wiring diagram of the rheostat conductor lines as is indicated in Figures 5 and 11.

Figure 16:
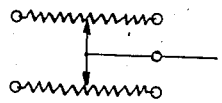

Figure 16 is a wiring diagram of the conductor lines of what is shown in Figures 13 and 14.

In the manufacture of our rheostats we prefer to provide the support bases B of any suitable non-conducting material, but preferably of a suitable vulcanite product.

This base support is provided with individual slots 2, 3, 32 and 33, parallel to predetermined radii at one side thereof and of equal length. There is also provided a central shaft opening 4 as well as three stud holes 5 by means of which the rheostat base support B is supported in any desired situation of service.

The operating shaft for moving the contact brush which contacts the resistance coils is indicated by 6 and any desired means may be applied as a handle or other means for revolving this shaft.

Mounted transversely in the shaft 6 there is a block 7 of insulation non-electrical material, preferably made of a suitable vulcanite product. On this block 7 there is mounted a conductor wire 8 which is wound and shaped to the block 7 to be carried thereby, and this wire has a loop projection brush 18 on one side for contact with the resistance coil 19, and on the other side has the ends of a wire 8 formed into a brush projection 20 adapted to contact a conductor ring 15. These contact projections are spring fingers which snugly press and slide along over the resistance coil 19 in one case and the conductor ring 15 in the other.

In forming our resistor element we provide an enamel coated core 9 sufficiently enameled to become a non-conductor as to its outside surface. This core 9 is of sufficient length to have wound around it an enameled resistance wire with insulation to prevent short circuiting between the two.

The core 9 is provided in a straight bar of sufficient length for any given size of rheostat to be made. The ends of this core 9 are shaped in any suitable manner to be supported in terminal blocks at the ends of the core, see Figure 4, in which a terminal block 11 is mounted on the end of the core 9 by the core being turned slightly smaller in diameter and pressed into a hole in the terminal block 11, forming an electrical connection of the body of the core to the block 11. At the other end of the core 9 it is connected to a core terminal block 13 and it is insulated therein by insulating material indicated by 12. The lower ends of the terminal blocks 11 and 13 are threaded for the purpose of having nuts 14 screwed thereon.

This resistance coil may be wound on the core 9 while the core is in a straight form or it may be wound after the core has been curved to the segment of a circle. When in the curved form the terminal blocks 11 and 13 are fitted into the slots 2 and 3 of the base B and adjusted along those slots to bring the resistance coil 19 concentric with the central shaft 6. The resistance wire 10 is connected to the terminal block 11, the conductor wire for the electric current being connected to the lower end of block 11.

The conductor ring 15 mounted on the base B, as shown by Figure 3, is provided with a connection 17 to the conductor wire of the electric circuit.

In the case of Figure 2, two rheostat coils and their connected parts are mounted on the said central shaft 6 and otherwise are provided with duplicated parts as before described. The design is such that one revolving shaft 6 may control both resistance coils 19, which may be alike or may be of different resistance values.

In Figure 5 there is provided on the base disk B a resistance coil 21 and a resistance coil 22, each being independent of the other and provided with the same type of terminal blocks for the coils, as is indicated in Figure 1.

A corresponding shaft 6 carries a double set of wire brushes made of the aforementioned wire 8, and these wire brushes are mounted on an insulating block 23 in said shaft 6. The wire brush which contacts the resistance coil 21 is provided with the loop 24 which presses on the coil 21, and the other end of this wire which forms the brush for the outside coil is turned with its ends coming together to form the contact brush 25 which presses on the conductor ring 26.

The wire brush for the inner coil 22 is provided with a loop projection 27 which presses on and slides along the resistance coil 22. The wire of this brush comes together at its terminal 28 and forms the brush which contacts the inner conductor ring 29.

The conductor wires of the electric circuit are connected to those two resistance coils 21 and 22 in a similar manner as shown in Figures 1 and 2 for the coils 19. In Figure 2 the bases B are connected together by the studs 30.

Referring now to the modified forms, as shown in Figures 7 to 10 inclusive, the same plate base disk B is employed, and there is mounted thereon a conductor ring 31 which is substantially a duplicate of the conductor rings heretofore mentioned. In this base there is provided, in Figure 7, slots 32 and 33 substantially like the arrangement of the slots 2 and 3 in Figure 3.

The resistnce coil as shown in Figures 7 and 10 inclusive is indicated by 34. This coil is mounted into terminal blocks 35 and 36. The block 35 is insulated by being connected to the base B and the coil 34 is secured to this terminal block 35, and it is mounted in the slot 33. The other end of the coil 34 is connected to the terminal block 36 which is mounted in the slot 32 in the disk base B. The terminal blocks 35 and 36 are at equi-distances from the central shaft 6' of the rheostat.

The block 36 is shown partly in section in Figure 9 and the resistance wire is soldered to the block 36 at 37 in a groove 38.

In the Figures 7 to 10 inclusive the brush for contacting the conductor ring 31 is composed of a wire of like character as is indicated by 8 as previously mentioned, and this wire 8 is wound upon a block 39 of insulating material mounted in the shaft 6', and this wire is formed into a loop which is bent closely upon itself and is covered over by a piece of silver tubing 40, thus forming a contact brush on the coil 34. The folded end of the said wire is indicated by 41 in Figure 9.

The other ends of the wire 8 which forms the brush which contacts the conductor ring 31 come together at 42 and from there outward are covered over with a silver tube 43. Thus the actual contact of the brushes to the coil 34 and the conductor ring 31 are made by the circular outside portions of the silver tubes 40 and 43. This makes substantially a line contact at the terminal block 36 of the coil 34. The terminal block 36 is grooved at 44 to allow the tube 40 to ride exactly over the last turn of the resistance coil 34.

As and when the brushes of this rheostat are turned to zero on the coil 34, this position is indicated by the dotted lines in Figure 1.

The slots 32 and 33 in the base support B are arranged to be parallel to that part of the brush indicated by 40 in order that the brush may be at right angles to any single coil which is contacted by the brush of the resistance coil 34, which then provides for an exact definite limited value of the resistance coil 34.

The purpose of using silver for the said tube ends of said brushes is to affort good conductivity and make a more complete and exact circuit connection to the said resistance coil. Other good conductors may also be used for such tube ends for the said brushes.

In Figures 7 to 10 inclusive the wire 8 which forms the body of the brushes 40 and 43 which are mounted on the shaft 6' through the medium of insulating block 39, the wire 8 is stiffened against bending by the block of insulating material 44 located between the strands of the wire 8 and fixed into the shaft 6.

Modifications of structures of Figures 11 and 12 from what are shown in Figures 1 to 6 inclusive relate to substituting plural holes 45 and 46 in place of the slots 2 and 3. Thus plural holes for adjustments permit adjustments for the same purposes as the slots, but not to the same extent as to relatively short lengths of adjustments.

In Figure 12 the holes 45 and 46 are shown for the locations of the terminal posts 11 and 13, and in this form there is shown a modified form of construction for the brush for contacting resistor coils 47 and 48 with the conductor ring 49. Thus the electric current may pass in contact with both coils 47 and 48 and through the terminals 45 and 46 to the conductor ring 49. This brush of Figures 13 and 14 is indicated by 50 and is made of wire 8 as previously mentioned herein and this wire is formed to produce two contact fingers, one being 51 on the coil 47 and the other 52 on the conductor ring 49. This brush 50 is provided with a contact surface 53 on the coil 48. A loop 54 of the wire 8 located in the brush between the coils 47 and 48 produces a spring structure whereby the contact from contact surface 53 to the finger 51 will bear down on the coil 47 in a normal functioning of an electric brush.

This construction of the brush 50 provides a brush which is relatively inexpensive and yet is highly efficient in the service required.

What I claim is:

1. In an instrument of the class described, a supporting base provided with a center aperture bearing for a revolving shaft, a set of two slots, which are individually parallel to separate predetermined radii, said slots spaced asunder from each other and of equal length and distance from the center of the said disk support and on one side of the base support, a suitable circular segment of a ring resistance coil, mounted concentrically on the said base disk support, terminal blocks connected to the ends of the said circular segment coil, said terminal blocks fixed to the said slots, each one in its slot the same distance from the center of the base disk support as is the case with the other block in its slot, a center conductor ring mounted concentrically with the said base disk support, a shaft mounted in a vertical and rotatable position in the central aperture of the said base support, a dual purpose brush assembly mounted on and insulated from the said central shaft, said brush located whereby one portion of the brush assembly contacts and slides over the said resistance coil segment, and the other portion contacts and slides over the said conductor ring, thus providing an electrical conductor line from the electric supply connection to the said segmental rheostat wire through the said conductor ring.

2. In an instrument of the class described, a supporting base provided with a central aperture bearing for a revolving shaft, a set of two slots which are individually parallel to separate predetermined radii spaced asunder from each other and of equal lengths and distances from the center of the said base support and on one side of the said base support, a suitable circular segment of a ring resistance coil mounted concentrically on the said base support, terminal blocks connected to the ends of the circular segment coil, said terminal blocks fixed into the said slots, each one in its respective slot the same distance from the center of the said base support as is the case with the other block in its slot, a circular conductor ring mounted concentrically with the said base support, a shaft mounted in vertical and rotatable position in the central aperture of the said base disk suport, a dual purpose brush assembly mounted on and insulated from the said central shaft and located whereby one portion of the brush assembly contacts and slides over the said resistance coil segment and the other portion contacts and slides over the said conductor ring, thus providing suitable electrical conductor lines from the electrical supply and connection to the said segmental rheostat coil and to the said conductor ring, said slots in the base support being mounted parallel to predetermined radii and being parallel to the brush arm in the contact position of said brush arm as and when said brush end is at maximum and zero position in contacting the said resistance coil.

3. In an instrument of the class described, a supporting base provided with a central aperture bearing for a revolving shaft, a set of two slots which are individually parallel to separate predetermined radii, spaced asunder from each other and of equal lengths and distances from the center of the said base support and on one side of the said base support, a suitable circular segment of a ring resistance coil mounted concentrically on the said base support, terminal blocks connected to the ends of said circular segment coil, said blocks fixed into the said slots each one in its slot the same distance from the center of the base support as is the case with the other block in its slot, a circular conductor ring mounted concentrically with the said base support, a shaft mounted in vertical and rotatable position in the central aperture of said base support, a dual purpose brush assembly mounted on and insulated from the said central shaft and located whereby one portion of the brush assembly contacts and slides over the said resistance coil segment and the other portion contacts and slides over the said conductor ring, thus providing electrical conductor lines from the electrical supply and connection to the said segmental rheostat coil and through the conductor ring, the said electrical conductor brush assembly being composed of a conductor wire coiled upon a block of insulating material, which block is mounted in the said vertical shaft and the said conducting wire provided with a loop which extends and contacts as brush upon the said resistance coil segment and the said wire having an extended portion from the said block of insulating material forming a contact brush contacting the said conductor ring.

4. In an instrument of the class described, a supporting base composed of insulating material, an electrical conductor ring mounted concentrically on the face of said base disk, a resistance coil in the form of a segment of a circle and mounted concentrically with the said base support, said segmental coil having its ends fixed to the terminal blocks, said terminal blocks being mounted in slots individually parallel to separate predetermined radii and each terminal block being equi-distant from the other in relation to the center of the said base support; in combination with a rotating shaft mounted in vertical arrangement in the center of said base support and provided with an electrical contact brush assembly for contacting the resistance coil and the electric conductor ring together with suitable conductor lines extending to the source of electrical supply and connected to the said conductor ring and to the said circular segmental resistance coil.

5. In a rheostat of the class described, a supporting base, a circular segmental resistance coil mounted on the face of the said base support, the terminal ends of the said coil supported in terminal blocks and said terminal blocks mounted in predetermined slots individually parallel to separate radii in said base support and located on one side thereof and extending toward the center of said disk support, said terminal blocks being adjustable along the length of said slots for the purpose of adjusting any given segmental circular resistance coil to be concentric with the said base disk support; in combination with an electrical contact brush assembly adapted to be rotated over the said circular segmental resistance coil in contact therewith.

6. In an instrument of the class described, a segment of a circular resistance coil, said coil mounted in terminal blocks at the ends of said coil, said coil mounted on a base support of insulating material, slots in said support which are parallel to predetermined radii on one side of said support in directions toward the center of said base support, said terminal blocks adjustable along the lengths of said slots in said base; in combination with a brush conductor mounted so that it may be moved over and in contact with the said resistance coil.

7. In an instrument of the class described, a segment of a circular resistance coil mounted on a disk support, a conductor ring embedded in said disk support, a central shaft vertically arranged to rotate therein, a contact brush assembly mounted on said shaft and adapted to be rotated in contact with said coil and conductor ring, said brush being composed of wire, a portion of which is coiled upon an insulating block and said insulating block being mounted through said central shaft.

8. In an instrument of the class described, a segment of a circular resistance coil mounted on a base support, a central shaft vertically arranged to rotate therein, a contact assembly brush mounted on said shaft and adapted to be rotated in contact with the said coil, an insulating block mounted transversely of said shaft, said brush assembly being composed of wire a portion of which is coiled upon said insulating block, a stiffening arm located between the brush strands of the said wire and extending to and fixed into the said shaft.

9. In an instrument of the class described, a supporting base on which are mounted resistor assemblies, two oblong slots in said base, said slots aligned parallel to predetermined radii whereby there may be made adjustments for the terminals of the resistance coils mounted on the said supporting base.

10. In an instrument of the class described, a base support, a circular segment of a resistor coil mounted on said support, a central vertical shaft mounted concentric with the said circular segment resistance coil, said resistance coil mounted on terminal blocks fixed in said base, the resistance wire of said coil connected to the said terminals, the top of the last coil at each end of said resistance coil located asunder from its contact with its terminal a distance equal to one-half the cross diameter of the brush body at the contact to the said coil.

11. In an instrument of the class described, a brush assembly formed of wire one end of which is shaped to slide over a resistor unit and the other end formed to slide over a stationary conductor ring, said brush assembly composed of a central body in the form of a spring coil, said spring coil mounted on a cross bar of insulating material and said cross bar mounted transversely of a vertical central shaft, and said shaft mounted concentric with the said conductor ring and the circular segmental resistance coil which is contacted by one end of said brush assembly.

12. In an instrument of the class described, a support base, resistor assemblies mounted on said base, two sets of plural numbers of holes centered on a line parallel to predetermined radii for the purpose of allowing variable length resistor assemblies to be mounted thereon.

13. In an instrument of the class described, a base support, a resistance coil in a circular segmental form mounted on said base support, a vertically arranged central shaft mounted on said base support concentric with said resistance coil segment, a brush assembly made of conductor wire and said wire folded on itself to form contact finger ends adapted to contact the coils of said resistor segment, said folded finger ends of said brush covered with tube portions which contact the wire of said resistor coil segment.

14. In an instrument of the class described, a base support, a resistance coil, a contact brush member adapted to contact said resistance coil composed of a conductor wire formed into a coil whereby it is mounted by means of this coil form to a supporting body, said supporting body adapted to carry and move the said brush member, said contact brush member having the wire of its coil form formed into a loop portion to produce a contact finger, a stiffening bar located in between the strands of the said loop and the said supporting bar fixed to said supporting body which carries the said brush.

ROBERT R. GONSETT.
FAUST R. GONSETT.